No. 846,246. PATENTED MAR. 5, 1907.
G. A. PRATHER.
BOX FASTENER.
APPLICATION FILED MAY 17, 1904.

2 SHEETS—SHEET 1.

Witnesses

Inventor
G. A. Prather
Attorneys

No. 846,246. PATENTED MAR. 5, 1907.
G. A. PRATHER.
BOX FASTENER.
APPLICATION FILED MAY 17, 1904.

2 SHEETS—SHEET 2.

Witnesses
Inventor
G. A. Prather
By
Chandler & Chandler
Attorneys

UNITED STATES PATENT OFFICE.

GRILLS AUGUSTUS PRATHER, OF GEORGE, MISSOURI

BOX-FASTENER.

No. 846,246.　　Specification of Letters Patent.　　Patented March 5, 1907.

Application filed May 17, 1904. Serial No. 208,453.

*To all whom it may concern:*

Be it known that I, GRILLS AUGUSTUS PRATHER, a citizen of the United States, residing at George, in the county of Franklin, State of Missouri, have invented certain new and useful Improvements in Box-Fasteners; and I do hereby declare the following to be a full, clear, and exact description of the invention, such as will enable others skilled in the art to which it appertains to make and use the same.

This invention relates to fasteners for boxes, and has for its object to provide a device of this nature which will be especially adapted for use in connection with egg-crates and similar receptacles, which will be simple of construction and cheap of manufacture, and which will act automatically when the lid of the receptacle is closed to prevent opening thereof.

A further object is to provide a construction in which accidental disengagement of the parts will be prevented, but in which the fastener may be quickly disengaged when desired.

Figure 1:
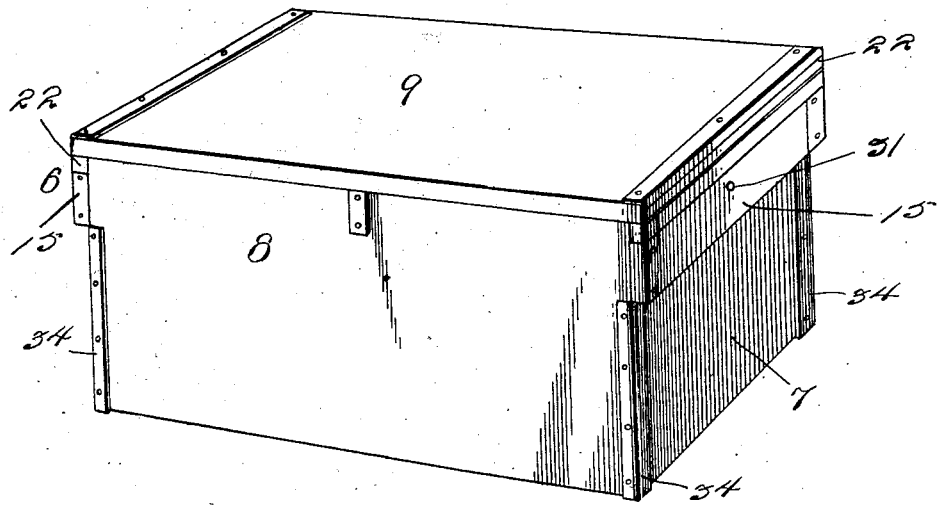
Figure 3:
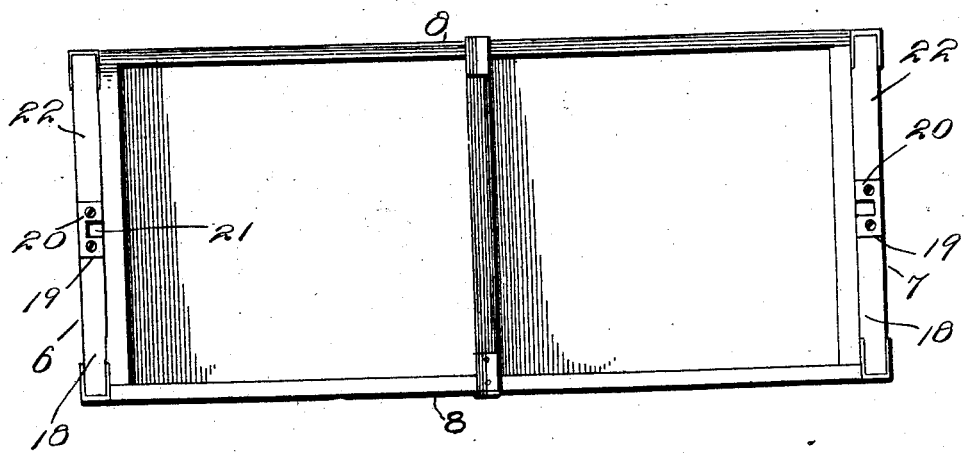
Figure 2:
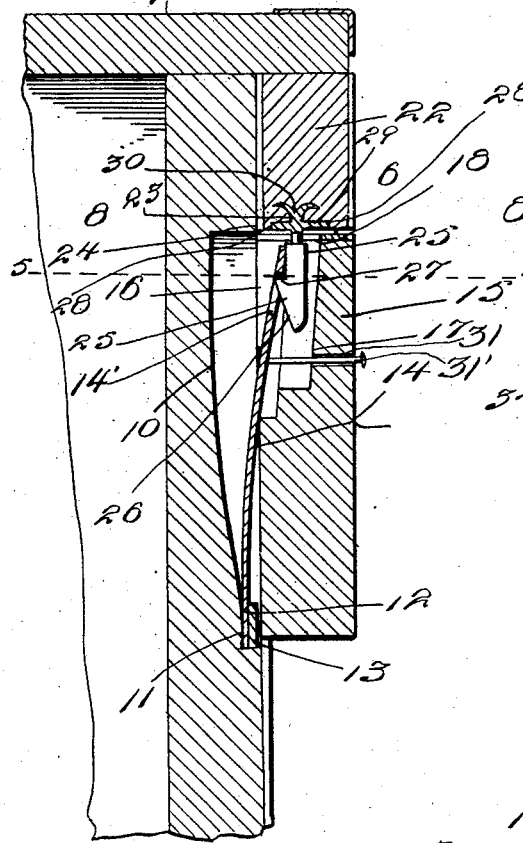
Figure 4:
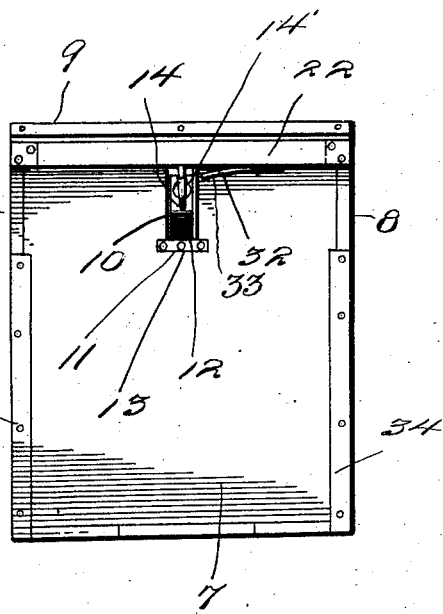
Figure 5:
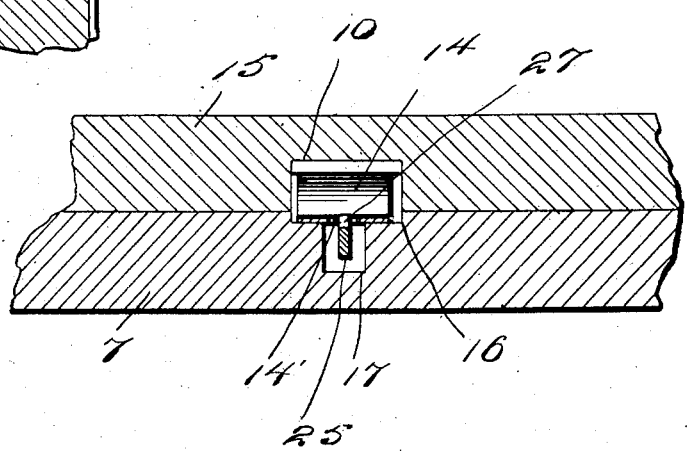

In the drawings forming a portion of this specification, and in which like numerals of reference indicate similar parts in the several views, Figure 1 is a perspective view of an egg-crate provided with the present invention. Fig. 2 is a detail sectional view of an end of the crate, showing the fastener. Fig. 3 is a top plan view of the crate with the cover removed. Fig. 4 is an end view of the crate with one of the cleats removed. Fig. 5 is a section on line 5 5 of Fig. 2.

Referring now to the drawings, there is shown a crate including ends 6 and 7, sides 8, and top 9. In the outer faces of the ends 6 and 7 are recesses 10, which are adjacent to the upper edges of the ends and which are somewhat deeper at their upper ends than at their lower ends. Communicating with the recesses at their lower ends are transverse recesses 11, in which are secured the lower ends 12 and laterally-extending ears 13 of spring-tongues 14, which extend into the recesses 10 and project therefrom at their free ends, as shown, the resiliency of the tongues permitting of the movement thereof into the recesses 10.

Secured to the ends 6 and 7 of the crate and covering the recesses 10 and 11 are cleats 15, having recesses 16 therein, which register with the upper ends of the recesses 10 and into which the free ends of the tongues 14 project, and which are provided with supplemental recesses 17 in their bottoms, both the recesses 16 and 17 communicating with the upper edges 18 of the cleats. Secured in recesses 19 in the edges 18 of the cleats are plates 20, having slots 21 in their inner edges which register with the recesses 17 and through which access may be had to the recesses 10, 16, and 17.

Secured to the ends of the top 9 are depending cleats 22, having vertical passages 23, with which are engaged the stems 24 of latches 25, having diagonal edges 26 and latching-faces 27. The latches 25 extend below the cleats 22 and are provided with shoulders 28, which lie in recesses 29 in the edges of the cleats, the upper ends of the stem being split, as shown at 30, the resultant spaced portions being bent in opposite directions and forced into the upper edges of the cleats against which the ends of the top 9 are secured. The latches 25 are so disposed that when the top 9 is placed upon the crate they will enter the slots 21 and their diagonal edges 26 will come into engagement with the upper ends of the spring-tongues 14, which will be moved thereby into the recesses 10 until the latching-faces 27 come into engagement with perforations 14' in the ends of the tongues 14, which will permit the free ends of the tongues to spring outwardly and which will also prevent withdrawal of the latches, thus holding the lid in position. Perforations 31 are formed through the cleats 15, through which may be passed means for engagement with the upper ends of the tongues 14 to move the same out of engagement with the latching-faces 27 to permit of removal of the lid.

Secured at one end to the under faces of the cleats 22 are spring-plates 32, which extend downwardly at an acute angle to the under face of the cleats 22 and have their free ends 33 in spaced relation to the said cleats and when the lid is in operative position bear against the edges 18 of the cleats 15, thus holding the latching-faces 27 of the latches 25 in engagement with the upper edges of the perforations 14' and prevent rattling of the lid. It will also be apparent that when the tongues 14 are moved to disengage the perforations 14' from the latches the tension of the plates 32 will move the latches upwardly and out of position to be reëngaged by the perforations 14' when the tongues 14 are allowed to return to their normal position. As shown in the drawings, the several corners of the crate are provided with binding 34, of tin or other suitable material.

In practice modifications of the specific construction shown may be made and any suitable materials and proportions may be used for the various parts without departing from the spirit of the invention.

What is claimed is—

In a device of the class described, the combination with a box having recesses in its ends, of spring-tongues secured at one of their ends in the said recesses and extending upwardly and outwardly from said recesses, the upper ends of said tongues being provided with openings, cleats secured to the said box at its ends and extending over the said recesses, said cleats having recesses in their sides adjacent the said box, said recesses in said cleats being in registration with the recesses in said box to receive the said upper end of said spring-tongues, said cleats being provided with openings communicating with said recesses therein, a lid for the box including a top portion and depending cleats, latches carried by the under edges of said last-named cleats and arranged to extend downwardly and into the recesses in said first-named cleats, said latches having each projections arranged to extend into the openings in said spring-tongues to hold the said top in closed position, springs secured to said last-named cleats at one end and resting against the upper faces of the first-named cleats to hold the said cleats and the said last-named cleats yieldably in spaced relation, the openings of the first-named cleats being adapted for the reception of an implement for engagement with the spring-tongues to move the latter out of engagement with the said latches.

In testimony whereof I affix my signature in presence of two witnesses.

GRILLS AUGUSTUS PRATHER.

Witnesses:
D. N. BAKER,
I. HENSLEY.